United States Patent
Kwasniewski et al.

(10) Patent No.: US 7,196,557 B1
(45) Date of Patent: Mar. 27, 2007

(54) MULTITAP FRACTIONAL BAUD PERIOD PRE-EMPHASIS FOR DATA TRANSMISSION

(75) Inventors: Tad Kwasniewski, Ottawa (CA); Haitao Mei, Ottawa (CA); Shoujun Wang, Nepean (CA); Mashkoor Baig, Ottawa (CA); Bill Bereza, Nepean (CA)

(73) Assignee: Altera Corporation, San Jose, CA (US)

( * ) Notice: Subject to any disclaimer, the term of this patent is extended or adjusted under 35 U.S.C. 154(b) by 477 days.

(21) Appl. No.: 10/756,949

(22) Filed: Jan. 13, 2004

(51) Int. Cl.
   *H03B 1/00* (2006.01)
(52) U.S. Cl. ........................... 327/108; 326/86
(58) Field of Classification Search ............ 327/63–66, 327/108–111, 261, 263; 326/83, 86
See application file for complete search history.

(56) References Cited

U.S. PATENT DOCUMENTS

| | | | |
|---|---|---|---|
| 3,633,120 A | 1/1972 | Battjes | 330/30 R |
| 4,723,110 A | 2/1988 | Voorman | 330/252 |
| 5,280,353 A * | 1/1994 | Baldwin | 348/674 |
| 5,420,538 A | 5/1995 | Brown | 330/252 |
| 6,236,231 B1 | 5/2001 | Nguyen et al. | 326/39 |
| 6,281,715 B1 * | 8/2001 | DeClue et al. | 327/65 |
| 6,650,140 B2 | 11/2003 | Lee et al. | 326/39 |
| 6,956,407 B2 * | 10/2005 | Baig et al. | 327/65 |
| 6,975,132 B2 * | 12/2005 | Groen et al. | 326/27 |
| 6,977,534 B2 * | 12/2005 | Radelinow | 327/112 |
| 2003/0052709 A1 | 3/2003 | Venkata et al. | 326/37 |
| 2003/0141919 A1 | 7/2003 | Wang et al. | |

OTHER PUBLICATIONS

U.S. Appl. No. 10/317,262, filed Dec. 10, 2002, Venkata et al.
U.S. Appl. No. 10/317,264, filed Dec. 10, 2002, Venkata et al.
U.S. Appl. No. 10/349,541, filed Jan. 21, 2003, Venkata et al.
U.S. Appl. No. 10/454,626, filed Jun. 3, 2003, Lui et al.
U.S. Appl. No. 10/640,824, filed Aug. 13, 2003, Wang et al.
U.S. Appl. No. 10/640,825, filed Aug. 13, 2003, Wang et al.
U.S. Appl. No. 10/702,195, filed Nov. 4, 2003, Baig et al.
U.S. Appl. No. 10/702,196, filed Nov. 4, 2003, Bereza et al.
U.S. Appl. No. 10/757,182, filed Jan. 13, 2004, Baig et al.
B. Gilbert, "The Multi-Tanh Principle: A Tutorial Overview", IEEE Journal of Solid-State Circuits, vol. 33, No. 1, Jan. 1998.

* cited by examiner

*Primary Examiner*—Dinh T. Le
(74) *Attorney, Agent, or Firm*—Fish & Neave IP Group of Ropes & Gray LLP; Robert R. Jackson; Brian E. Mack

(57) ABSTRACT

Pre-emphasis circuitry and methods for signal transmission provide multiple levels of output signal amplification over one or more baud periods after an input signal transition. The multiple, gradually decreasing levels of output signal amplification reduce power consumption and better approximate the desired signal response.

28 Claims, 12 Drawing Sheets

MULTITAP FRACTIONAL BAUD PERIOD PRE-EMPHASIS FOR DATA TRANSMISSION

BACKGROUND OF THE INVENTION

This invention relates to signal transmission circuitry and methods. More particularly, this invention relates to pre-emphasis of data signals to improve signal transmission quality.

Signals transmitted at high frequencies and low voltages are particularly susceptible to signal losses over long traces. Traces are signal transmission paths through signal wiring, integrated circuit bus structures, PCBs (printed circuit boards), etc. Signal losses can be caused by, for example, attenuation, which is a decrease in the power of a signal, crosstalk, which is an adverse effect caused by signal transmission on an adjacent trace, and intersymbol interference, which is an adverse effect caused by residual noise from a previously transmitted signal. These losses can adversely affect the speed and accuracy at which transmitted data is received. For example, a logical 1 data signal may be incorrectly received as a logical 0 data signal and vice versa. An entire system can therefore be adversely affected by such signal transmission losses.

To compensate for such losses, signals may be "pre-emphasized." Pre-emphasis is extra power (usually in the form of extra voltage, but extra current may be an equivalent) briefly applied to a transmitted signal immediately adjacent each signal transition (i.e., a signal changing from a logical 0 to logical 1 and vice versa). Pre-emphasis helps more quickly change the state of the medium transmitting the signal to receiver circuitry, and helps the receiver circuitry respond more rapidly to the change in state of the transmitted signal.

Pre-emphasis is becoming increasingly important as communication protocols and standards call for lower and lower signaling voltages (or currents) and increased signaling speeds. For example, very low signaling voltages are being specified for low voltage differential signaling ("LVDS") and current mode logic ("CML") communication protocols. A typical CML protocol may have a voltage swing of only 0.4 volts. At the same time, such a protocol may specify data transmission in the gigabit (i.e., billion bits) per second range. At such low voltages and high data rates, transmission line losses become a serious impediment to accurate and error-free reception of transmitted data.

Known pre-emphasis circuitries typically amplify a data signal at a constant amplitude level for the full duration of a baud period. A baud period can be generally thought of as the minimum amount of time between signal transitions. Such pre-emphasis, while improving signal transmission quality somewhat, does not adequately approximate the desired pulse shape of the transmitted signal. Thus, transmitted signals still lack the robustness desired for long traces and are accordingly still subject to transmission losses from, for example, crosstalk and residual noise. Moreover, because such known pre-emphasis is applied at a constant amplitude for the entire baud period, it results in high power consumption. Accordingly, known pre-emphasis circuitries can benefit from improvement.

SUMMARY OF THE INVENTION

In accordance with the invention, pre-emphasis circuitries and methods are provided that pre-emphasize signal transitions via a series of amplitude levels or steps rather than via a single amplitude level as is known. Such a series of levels better approximates the desired signal pulse shape and thus improves the speed and accuracy at which data can be received, particularly over long traces. The invention includes various embodiments of delay line and transmitter circuitries and methods that provide the series of pre-emphasis amplitude levels. For example, the invention advantageously includes both a synchronously clocked delay line and a master-slave calibrated delay line. Furthermore, both CML and LVDS transmitter circuitry implementations are provided.

The invention is advantageously applicable to both differential and single-ended signaling systems. Differential signaling involves the transmission of pairs of signals that propagate in parallel. Each is usually a logical complement of the other. That is, when one signal is at a high voltage (e.g., a logical 1), the other is at a low voltage (e.g., a logical 0), and vice versa. Pre-emphasis circuitry of the invention operates on the differential pair of signals substantially simultaneously.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
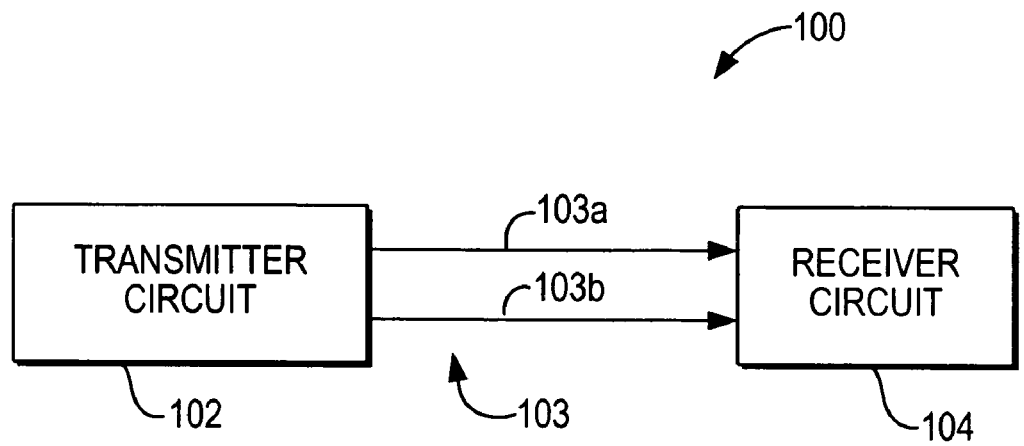
FIG. 1 is a simplified block diagram illustrating circuitry involved in signal transmission that can be constructed in accordance with the invention.

An illustrative digital data transmission system is shown in FIG. 1. System 100 includes transmitter circuit 102, communication link 103, and receiver circuit 104. In this embodiment, communication link 103 includes two conductors 103a and 103b (e.g., signal wires) extending from transmitter 102 to receiver 104. Communication link 103 is a differential signaling link, which means that the value of a digital data bit is indicated by whether the voltage on conductor 103a is higher than the voltage on conductor 103b or vice versa. For example, a logical 1 data bit may be indicated by the voltage on conductor 103a being higher than the voltage on conductor 103b, and a logical 0 data bit may be indicated by the voltage on conductor 103b being higher than the voltage on conductor 103a. The signals on the two conductors are effectively complements of one another. Differential signaling has a number of protocols, such as, for example, LVDS and CML, to which system 100 can be designed to operate. The invention advantageously can support many of these protocols, whether industry standard, non-standard, or variations thereof.

Figure 2:
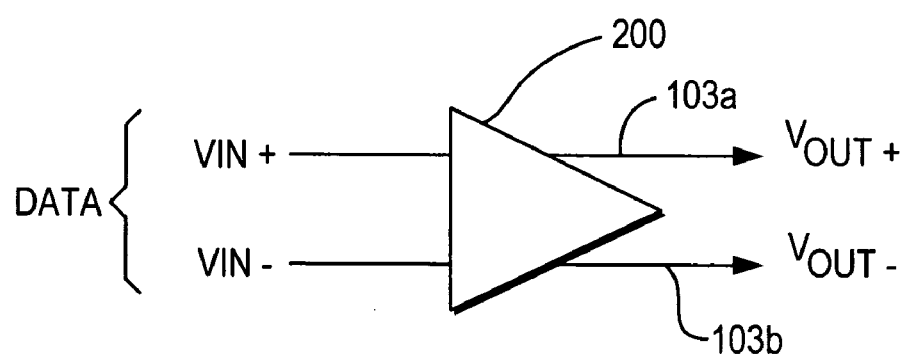
FIG. 2 is a simplified schematic diagram of a component that can be included in the circuitry of FIG. 1 and that can be constructed in accordance with the invention.

FIG. 2 shows an output driver 200 that can be included in transmitter circuit 102. Driver 200 converts a data signal (e.g., generated elsewhere in transmitter 102) to a form suitable for transmission on conductors 103a,b. Driver 200 receives input signal VIN+, which can be considered a "true" version of the data signal, and input signal VIN−, which is a complement or inverted version of the data signal. (Alternatively, driver 200 may receive only one of these signals and may itself generate any necessary inverted version of the received signal.) Driver 200 responds to the VIN signals by producing signals VOUT+ and VOUT− on respective conductors 103a,b. These VOUT signals represent the data content of the VIN signals and conform to the various parameters of the differential signaling protocol adhered to by communication link 103. For example, these parameters may include maximum and minimum voltages, permissible common mode voltage, polarity of the voltage difference representing logical 1 and logical 0 data bits, etc.

Advantageously, output driver 200 can be designed in accordance with the invention to pre-emphasize signals VOUT+ and VOUT− corresponding to every transition of signals VIN+ and VIN−, respectively. This pre-emphasis is extra voltage applied to the VOUT+ and VOUT− signals for a certain amount of time immediately following every transition of the input signals.

Figures 3, 4, 5:
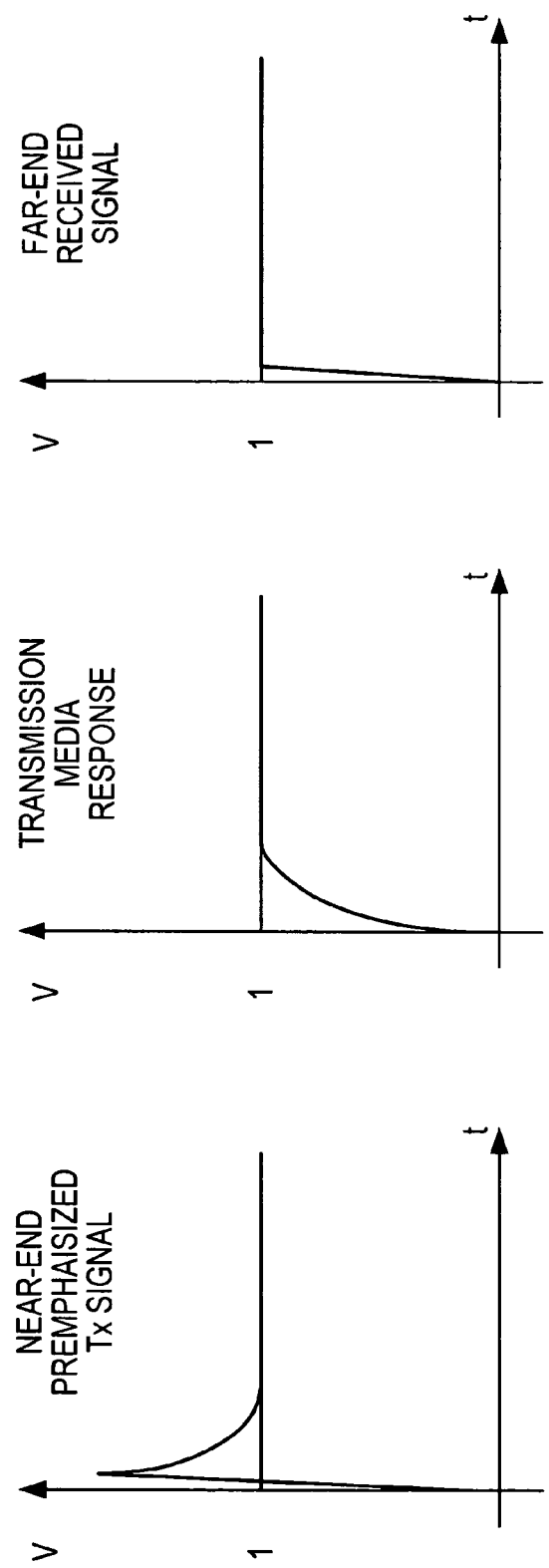
FIGS. 3–5 are plots of a signal transition at several points in the circuitry of FIG. 1.

FIGS. 3–5 show the effect of an ideal pre-emphasis in a logical 0 to logical 1 signal transition. FIG. 3 shows an ideal voltage waveform (versus time) of an output signal as it is output from a transmitter circuit onto a communication link. Note the initial extra voltage of the signal above the logical 1 voltage level. FIG. 4 shows an ideal voltage waveform of the communication link's response to receiving the output signal. Note the rapid rise time to the logical 1 voltage level. FIG. 5 shows an ideal voltage waveform produced by a receiver circuit. Again, note the rapid rise time to the logical 1 voltage level. The degree to which an ideal pre-emphasis is achieved is determined in large part by the output generated by the pre-emphasis circuitry.

Figure 6:
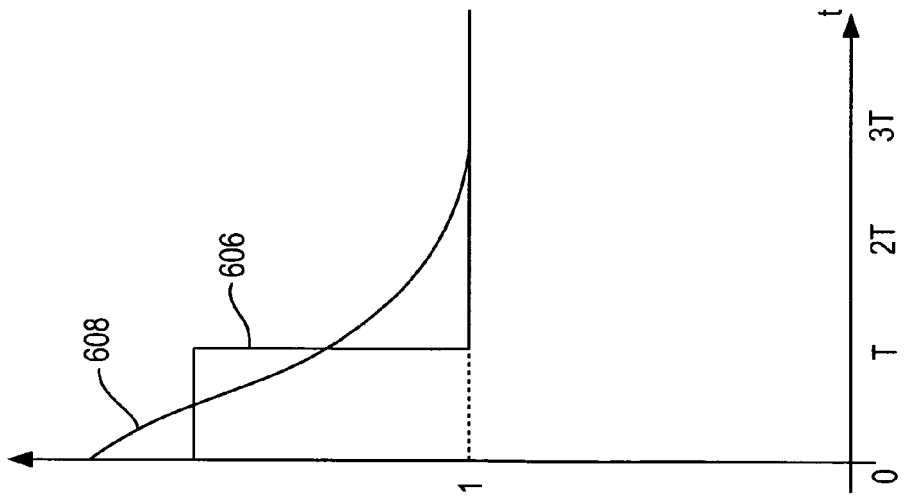
FIG. 6 is a plot of a pre-emphasized signal by known pre-emphasis circuitry.

FIG. 6 shows the output of known pre-emphasis circuitry. Typically, the extra voltage of generated output 606 is applied during an entire baud period (T). A baud period can be simplistically thought of (for clarity with respect to the invention) as the minimum time period at which an input signal maintains the same value. Thus, for example, if input data consists of three sequentially transmitted logical bits "010," the minimum period of time between the signal changing from 0 to 1 and from 1 to 0 is a baud period. Note that the time a signal maintains the same value can be longer than a baud period. For example, if the input data consists of bit values "011," the logical 1 value remains the same for longer than a baud period. A disadvantage of known pre-emphasis circuitry is evident from the relatively large error between generated output 606 and the desired response 608. A closer approximation to the desired response (i.e., an improved pre-emphasis) ultimately results in a stronger, more rapid transition at the receiver circuit.

Figure 7:
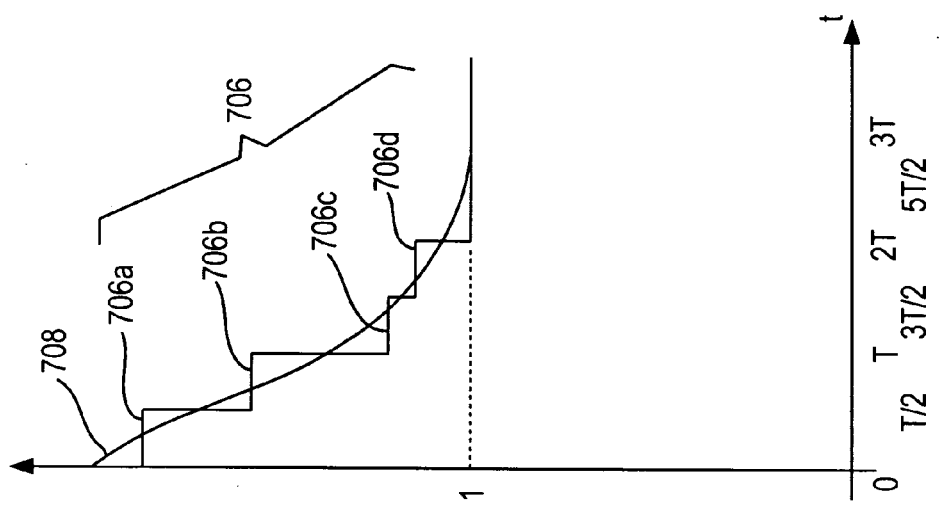
FIG. 7 is a plot of a pre-emphasized signal by pre-emphasis circuitry constructed in accordance with the invention.

FIG. 7 shows the generated output of one embodiment of pre-emphasis circuitry in accordance with the invention. Generated output 706 has a series of amplitude levels 706a–d extending over two baud periods (2T) that better approximates the desired response 708. Advantageously, the invention can achieve even closer approximations by increasing the number of amplitude levels and/or extending the output beyond two baud periods.

Pre-emphasis applied for the entire duration of a baud period as shown in FIG. 6 clearly consumes more power than pre-emphasis of the invention in which an applied series of amplitude levels gradually decreases as shown in FIG. 7. Pre-emphasis applied for the entire duration of a baud period may also increase jitter, which is the abrupt, spurious variation in the magnitude of successive signal pulses.

Figure 8:
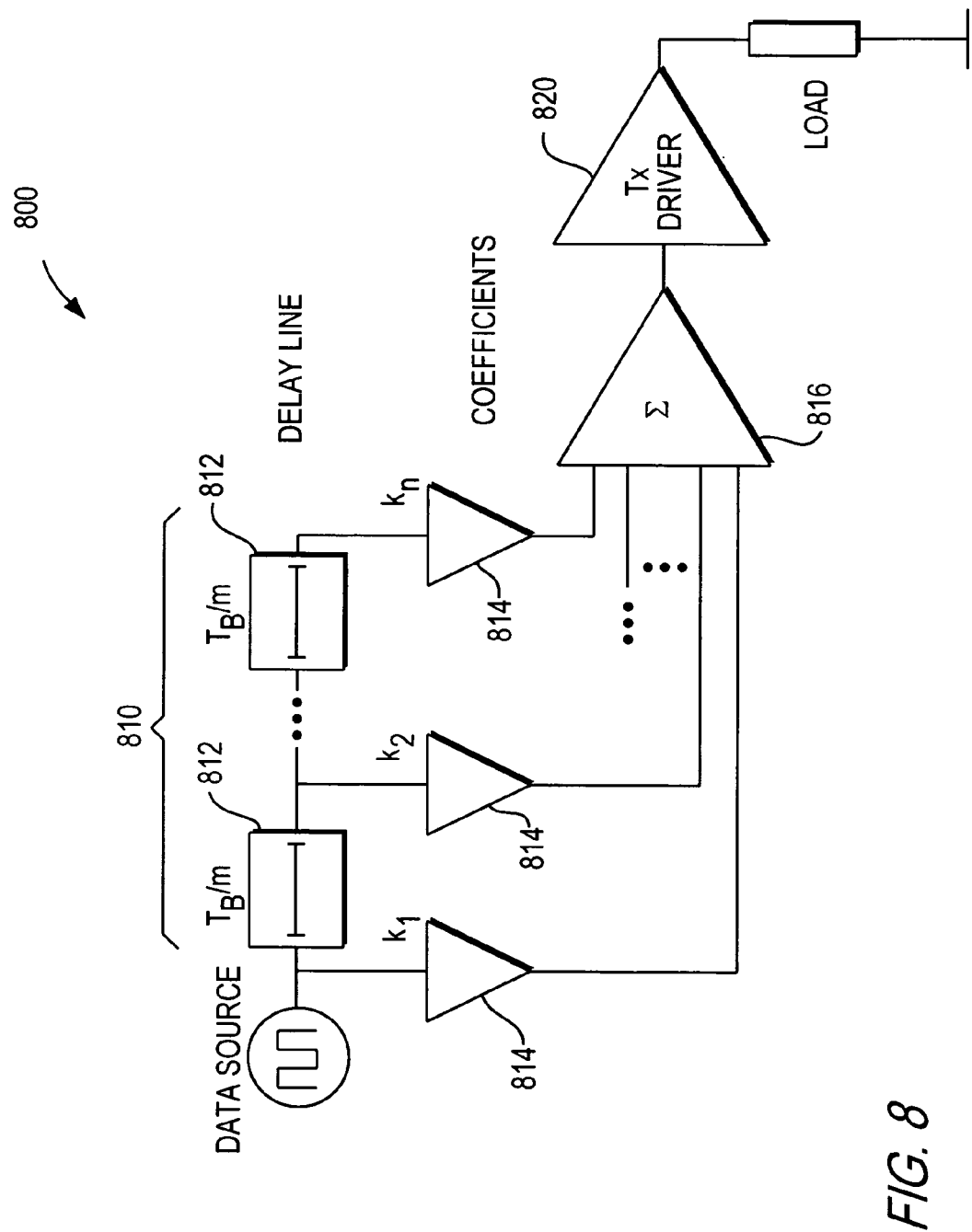
FIG. 8 is a simplified block diagram of an illustrative embodiment of pre-emphasis circuitry constructed in accordance with the invention.

FIG. 8 shows a high level pre-emphasis transmitter circuit in accordance with the invention. Pre-emphasis circuit 800 includes a delay line 810, which has (n−1) delay elements 812. Each delay element 812 has a unit delay equal to T/m, where T is a baud period and m is an integer. Pre-emphasis circuit 800 also includes n coefficient multiplication blocks 814. Note that in known pre-emphasis circuits used in gigabit data transmission, m=1 and n=1. Pre-emphasis circuit 800 further includes analog adder 814 and transmitter driver 816. Coefficient blocks 814, delay line 810, and adder 814 form a FIR (finite infinite response) filter. FIR filters are used to implement digitally many different types of output responses. In general, depending on the duration of each input and the total delay of the delay line, a FIR filter produces a weighted average of its n most recent inputs or a fractional weighted average of one input. Returning to circuit 800, each of the inputs to adder 814 represents a "tap" of the filter, which when output, forms all or part of the amplitude levels shown in FIG. 7. The amplitude of each level is determined by the individual coefficients, and the duration of each amplified level is determined by the unit delay T/m of delay line 810. Moreover, additional amplitude levels of finer granularity can be advantageously output by increasing the length of the FIR filter (i.e., by adding additional unit delays 812 and corresponding coefficient blocks 814).

Figure 9:
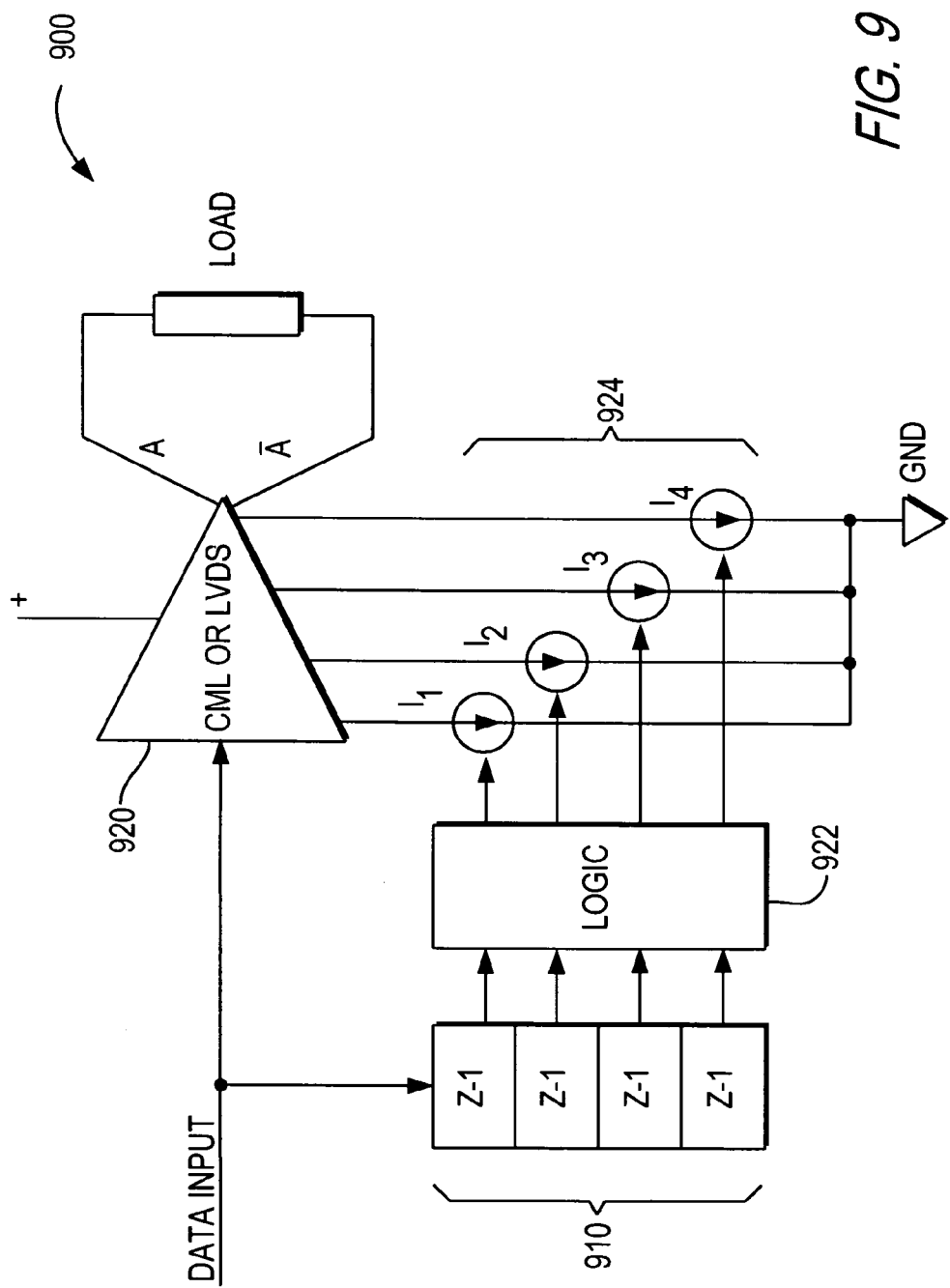
FIG. 9 is a simplified block diagram of another illustrative embodiment of pre-emphasis circuitry constructed in accordance with the invention.

FIG. 9 shows another embodiment of pre-emphasis circuitry in accordance with the invention. Pre-emphasis circuitry 900 includes delay line 910, which has a number of delay blocks denoted Z-1 each having a delay of T/m. Circuitry 900 also includes output driver 920, which may be, for example, a CML or LVDS protocol driver, and which may use differential (as shown) or single-ended signaling. The load may include, for example, a printed circuit board or backplane. Circuitry 900 further includes logic circuitry 922 and a number of current sources 924. The number of current sources 924 is equal to the number of delay blocks in delay line 910. Note that the four delay blocks and four current sources 924 shown in FIG. 9 are merely illustrative, other numbers of delay blocks and current sources can be used depending on the desired number and duration of amplitude levels in the output.

An input data stream enters output driver 920 as well as delay line 910. Output driver 920 initially outputs an amplified signal at a maximum voltage level. As the delay line outputs are fed to logic circuitry 922 after their respective delays are incurred, logic circuitry 922 generates activation or enablement signals for current sources 924. As each current source 924 is in turn activated, more and more current is drawn from driver 920, thus reducing the voltage level of the output signal in a series of steps. Each step has the approximate duration of a Z-1 delay block. The relative size of each current source 924 (i.e., the amount of current that each current source 924 can sink) can be selected as desired to give the output waveform desired amplitude levels. An output waveform identical or similar to FIG. 7 can thus be created. Note that the peak-to-peak saturation voltages of the transistors used in driver 920 (see FIGS. 14 and 15 for circuit implementations) are changed by the changing supply currents I1–I4. The output driver can thus be commonly used in a digital circuit regenerative type driver as opposed to a linear, unity gain driver.

Advantageously, the pre-emphasis circuits of FIGS. 8 and 9 consume less power than known pre-emphasis circuits generating outputs having the waveform of FIG. 6.

Figure 10:
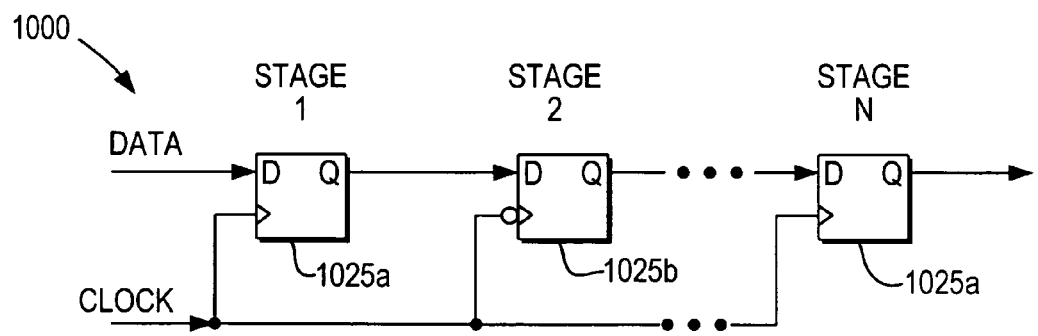
FIG. 10 is a simplified block diagram of an embodiment of delay line circuitry that can be used in the pre-emphasis circuitries of FIGS. 8 and 9 in accordance with the invention.

FIG. 10 shows an embodiment of delay line circuitry that can be used to implement delay lines 810 and 910 in accordance with the invention. Delay line circuitry 1000 includes a series of alternating 1025a and 1025b delay stage D-latches. The 1025b D-latches receive an inverting clock input. The alternating use of inverting and non-inverting clock inputs results in a 1/2 clock period data delay between delay stages. The odd numbered stages (e.g., stage 1, stage 3, etc.) move data from input D to output Q on the rising edge of the clock signal, and the even numbered stages (e.g., stage 2, stage 4, etc.) move data on the falling edge of the clock signal. This arrangement can result in the generation of an output signal having two amplitude level steps per baud period over a given number of baud periods.

Figure 11:
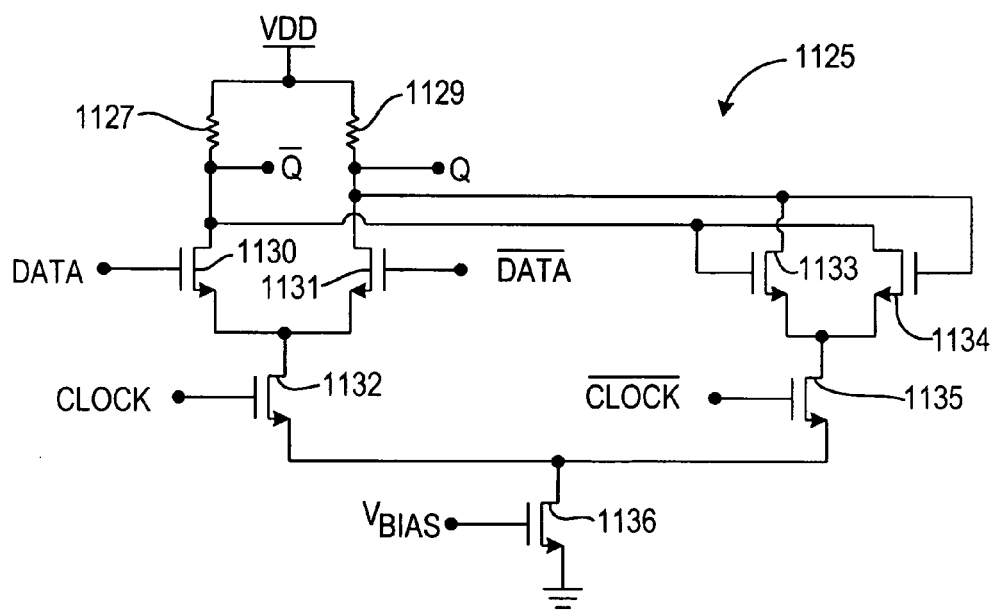
FIG. 11 is a circuit diagram of an embodiment of a delay stage that can be used in the delay line circuitry of FIG. 10 in accordance with the invention.

FIG. 11 shows a differential signaling CMOS circuit implementation for the D-latch of FIG. 10 in accordance with the invention. D-latch 1125 is suitable for gigabit operation and includes resistors 1127 and 1129 coupled to power supply voltage VDD and NMOS transistors 1130–1136. Transistor 1130 receives the DATA signal while transistor 1132 receives the CLOCK signal. VBIAS is a control or enablement signal that when high (e.g., a logical 1 voltage) allows D-latch 1125 to operate. To use D-latch 1125 as an odd numbered stage 1025a, the Q output is coupled to the next delay stage. The Q output receives the value of the DATA signal on the rising edge of the CLOCK signal. To use D-latch 1125 as an even numbered stage 1025b, the Q complement output is coupled to the next delay stage. The Q complement output receives the value of the DATA signal on the falling edge of the CLOCK signal.

Figure 12:
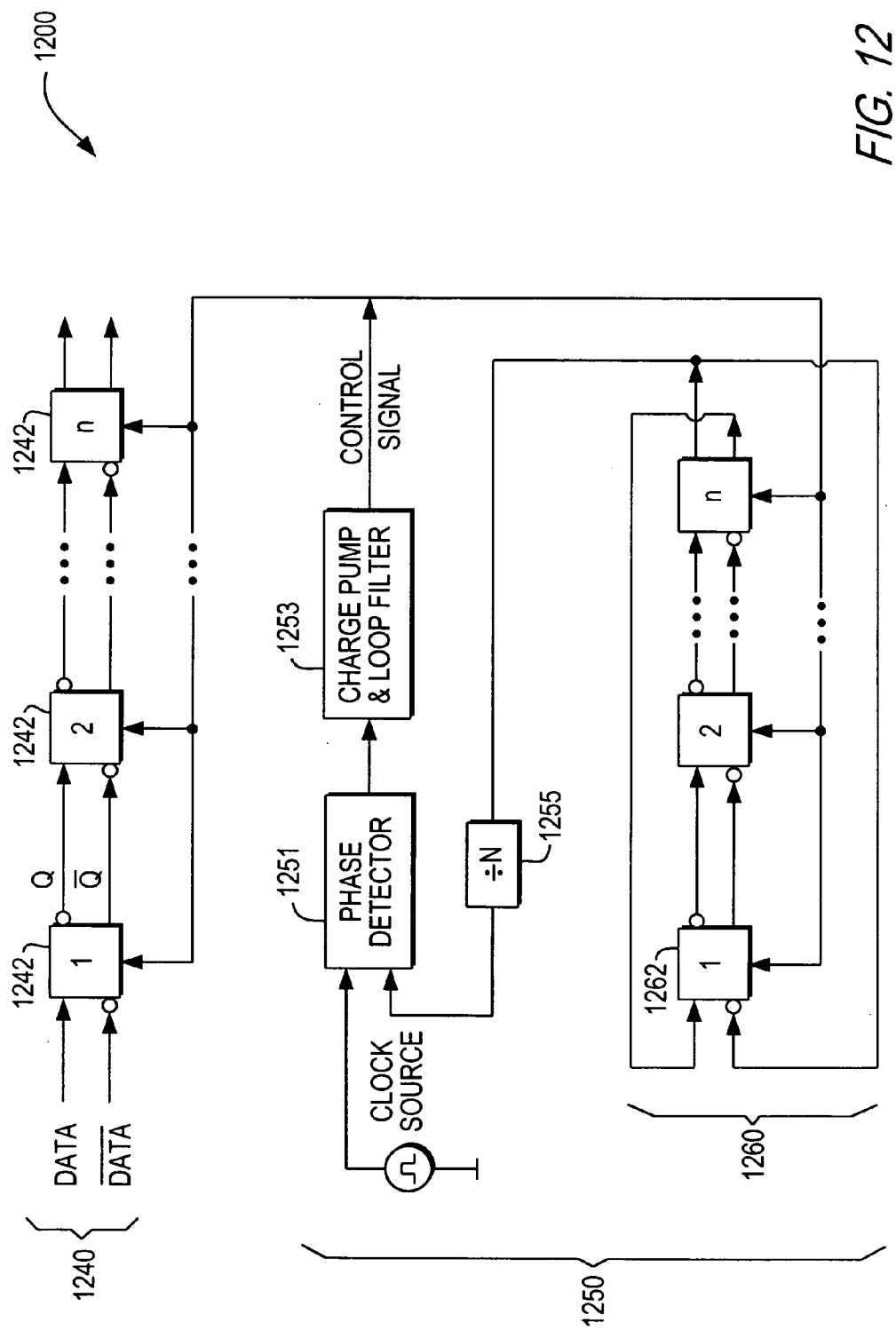
FIG. 12 is a block diagram of another embodiment of delay line circuitry that can be used in the pre-emphasis circuitries of FIGS. 8 and 9 in accordance with the invention.

FIG. 12 shows another embodiment of delay line circuitry that can be used to implement delay lines 810 and 910 in accordance with the invention. Delay line circuitry 1200 does not use a clock source synchronous to the data stream. The fractional delay (of the baud period) is obtained via a calibrated master-slave delay line arrangement. Delay line circuitry 1200 includes delay line slave 1240, which has n stages of inverting delay blocks 1242, and master loop 1250. Master loop 1250 includes phase detector 1251, charge pump & loop filter 1253, divide-by-n circuit 1255, and ring oscillator 1260. Ring oscillator 1260 includes n stages of inverting delay blocks 1262. Delay blocks 1242 and 1262 are preferably identical in both number and construction.

A clock source is applied to phase detector 1251, which generates an error signal that in phase-locked loop arrangements aligns the phases (and thus the frequencies) of the signals at the phase detector inputs. These two signals are the clock signal and the divided-by-n signal out of ring oscillator 1260. This results in the clock signal period T equaling n periods of the ring oscillator and (n×1) delays of the individual delay stages of the oscillator ring, where 1 is the number of stages in ring oscillator 1260. Because the same control signal adjusts the speed of both delay line slave 1240 and oscillator 1260, the delay of the slave becomes calibrated and is thus ensured of being (n×1) times shorter than the period of the clock signal. Advantageously, this arrangement allows arbitrary fractions of the baud period to be obtained. In particular, 1/2, 1/3, and 1/4 ratios can be obtained. The fraction determines the number of output signal amplitude levels that can be provided within a baud period.

Figure 13:
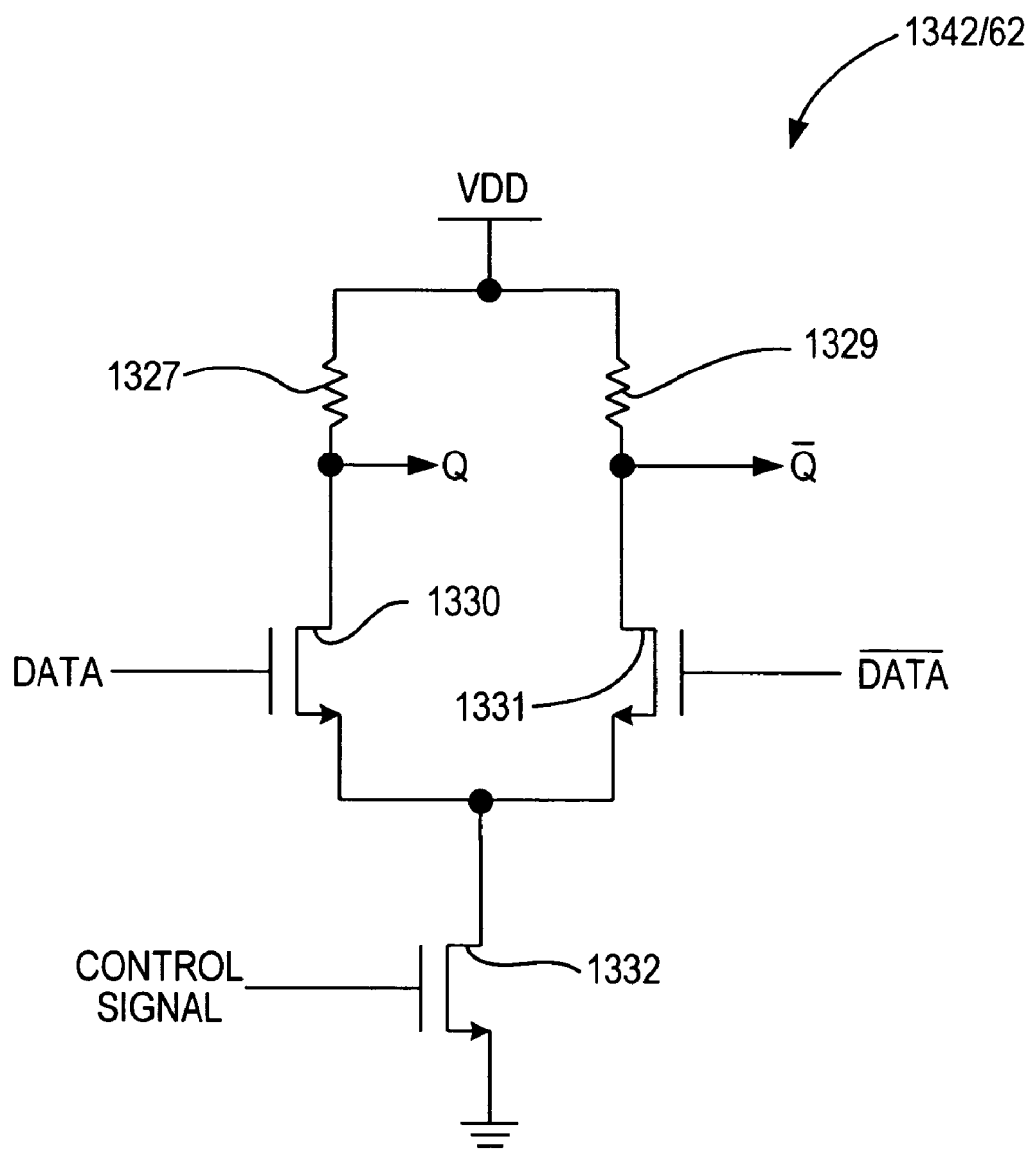
FIG. 13 is a circuit diagram of an embodiment of a delay stage that can be used in the delay line circuitry of FIG. 12 in accordance with the invention.

FIG. 13 shows an embodiment of a CMOS circuit that can be used to implement delay block stage 1242 and 1262. Circuit 1342/62 includes resistors 1327 and 1329 and NMOS transistors 1130–1132. Transistor 1330 receives the DATA input, transistor 1131 receives complementary DATA input, and transistor 1132 receives the CONTROL SIGNAL input. When input DATA and CONTROL SIGNAL are both high and complement DATA signal is low, transistors 1330 and 1332 are ON (i.e., conducting), while transistor 1331 is OFF (i.e., non-conducting). Output Q is thus low, while output complement Q is high.

Figure 14:
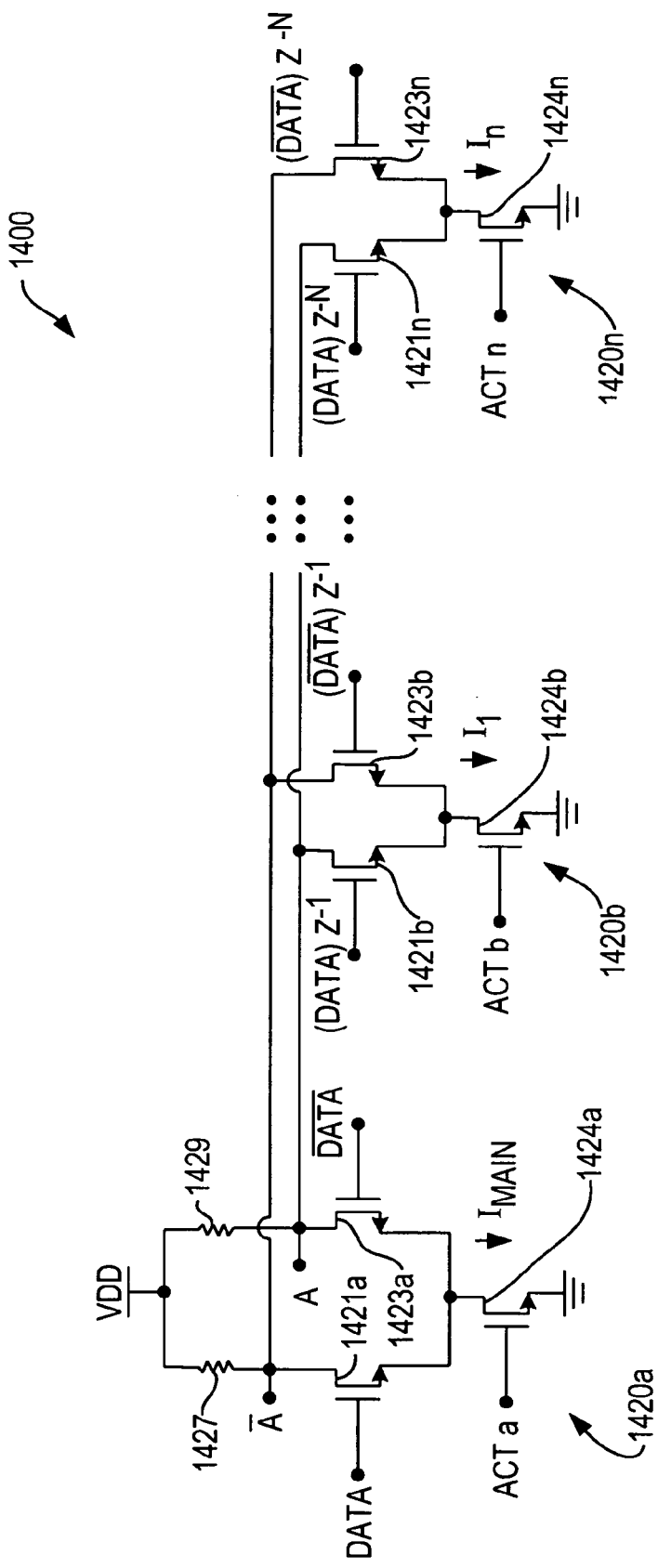
FIG. 14 is a circuit diagram of an embodiment of a CML transmitter circuit that can be used in the pre-emphasis circuitry of FIG. 9 in accordance with the invention.

FIG. 14 shows a CML embodiment of a CMOS circuit that can be used to implement the transmitter portion (including output driver 920 and current sources 924) of pre-emphasis circuitry 900 in accordance with the invention. CML circuit 1400 includes n current blocks connected in parallel and may be referred to as having n-taps. Circuit 1400 includes resistors 1427 and 1429 (coupled to power supply voltage VDD), output nodes A and complement A, and current blocks 1420a,b,n. The number of current blocks in CML circuit 1400 determines the number of amplitude levels in the output signal.

Main current block 1420a includes NMOS transistors 1421a, 1423a, and 1424a. Transistor 1424a is controlled by signal ACTa and sinks current Imain when it and one of transistors 1421a and 1423a are ON. Transistor 1421a receives input signal DATA, while transistor 1423a receives the complement of input signal DATA. This current block generally corresponds to output driver 920.

Similarly, current block 1420b includes NMOS transistors 1421b, 1423b, and 1424b. Transistor 1424b is controlled by signal ACTb and sinks current I1 when it and one of transistors 1421b and 1423b are ON. Transistor 1421b receives input signal $(DATA)Z^{-1}$, while transistor 1423b receives the complement of input signal $(DATA)Z^{-1}$. These data signals are the same as those received by current block 1420a, but delayed by about one unit delay (such as, e.g., the delay of one Z-1 block of FIG. 9). When this current block is active, a logical 1 output at either output A or output complement A is reduced in amplitude by a voltage equal to (current I1)×(resistor 1427 or 1429).

Current block 1420$n$ is similar to the others and includes NMOS transistors 1421$n$, 1423$n$, and 1424$n$. Transistor 1424$n$ is controlled by signal ACTn and sinks current In when it and one of transistors 1421$n$ and 1423$n$ are ON. Note that currents Imain, I1, and In are all preferably constant, but not necessarily equal. Transistor 1421$n$ receives input signal (DATA)$Z^{-n}$, while transistor 1423$n$ receives the complement of input signal (DATA)$Z^{-n}$. These data signals are the same as those received by current block 1420$a$, but delayed by the total delay of a delay line (such as, e.g., as received from the last Z-1 delay block in delay line 910 of FIG. 9). Current block 1420$n$ further reduces the voltage at either output A or output complement A by an additional voltage equal to (current In)×(resistor 1427 or 1429).

Activation signals ACTb-n may be generated from control logic, such as, for example, logic circuitry 922. Such control logic receives input from a delay line (such as, for example, delay lines 810 and 910), which receives data signals to be transmitted. Activation signals ACTb-n may additionally be derived from main current block activation signal ACTa in conjunction with inputs received by a delay line.

Note that for clarity in FIG. 9, individual delayed data signals (such as, e.g., (DATA)$Z^{-1}$ and (DATA)$Z^{-n}$ shown in FIG. 14) are not shown connected from delay line 910 to output driver 920.

Figure 15:
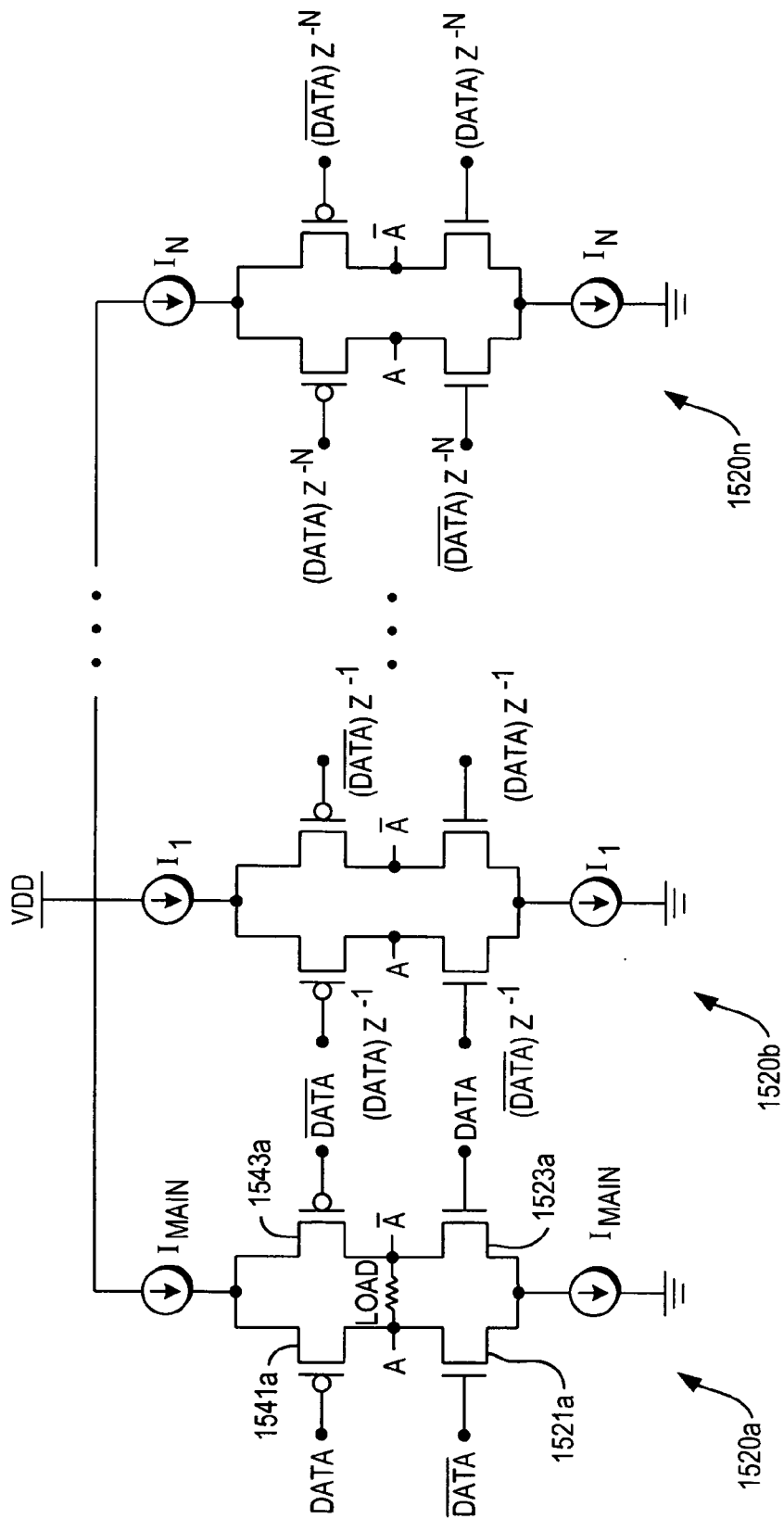
FIG. 15 is a circuit diagram of an embodiment of a LVDS transmitter circuit that can be used in the pre-emphasis circuitry of FIG. 9 in accordance with the invention.

FIG. 15 shows an LVDS embodiment of a CMOS circuit that can be used to implement the transmitter portion (including output driver 920 and current sources 924) of pre-emphasis circuitry 900 in accordance with the invention. LVDS circuit 1500 includes n current blocks connected in parallel and may be referred to as having n-taps. Current blocks 1520$a,b,n$ are each coupled to power supply voltage VDD and are coupled to output nodes A and complement A, which have a load, shown as a resistor, coupled between them. As in circuit 1400, the number of current blocks in CML circuit 1500 determines the number of amplitude levels in the output signal. Main current block 1520$a$ includes NMOS transistors 1521$a$ and 1523$a$, PMOS transistors 1541$a$ and 1543$a$, and a pair of current sources/sinks Imain. Transistors 1541$a$ and 1523$a$ receive input signal DATA, while transistors 1543$a$ and 1521$a$ receive the complement of input signal DATA. Current blocks 1520$b$ and 1520$n$ are constructed similarly (reference numerals for some circuit elements are omitted for clarity), and receive signals DATA and complement DATA delayed by a correspondingly respective number of unit delays. That is, current block 1520$b$ receives data signals delayed by one unit delay, while current block 1520$n$ receives data signals delayed by n unit delays. No separate activate or enable signal is required to operate circuit 1500.

In addition to pre-emphasis circuitry, the principles of the invention are also advantageously applicable to equalization circuitry. Equalization circuitry provides receiver circuitry with the capability of increasing the strength of a received signals, especially immediately adjacent any transitions in the received signals. The receiver circuitry can therefore more rapidly begin to respond to a change in the data being transmitted. This allows systems to be operated more rapidly, more reliably, at lower voltages, and/or with various combinations of these advantages employed to various different degrees.

Figure 16:
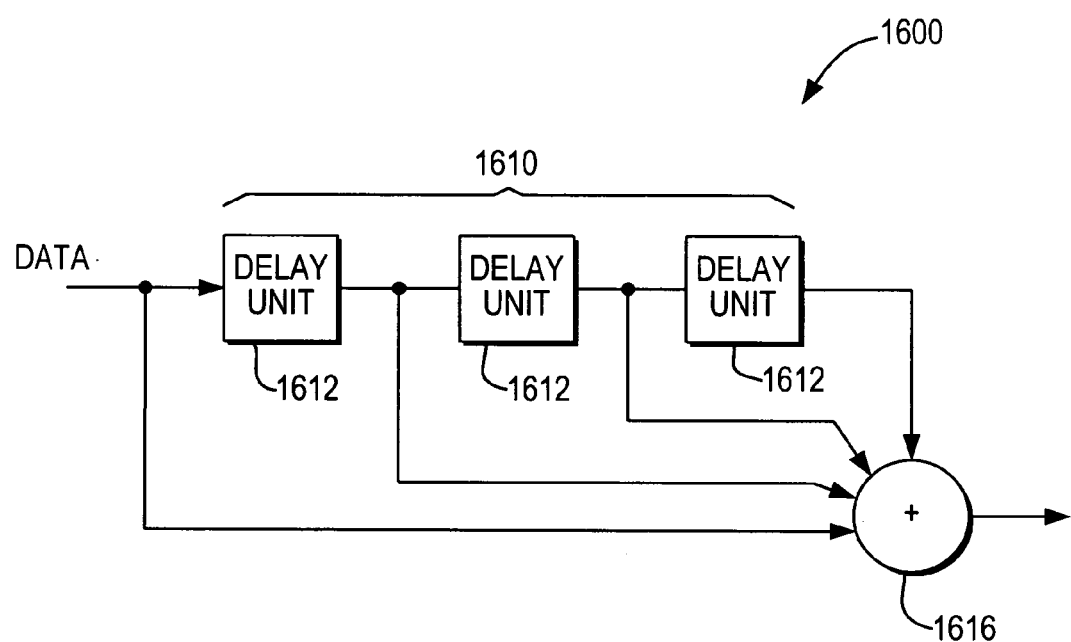
FIG. 16 is a simplified block diagram illustrating circuitry that can be used in equalization/receiver circuitry in accordance with the invention.

FIG. 16 shows a generalized embodiment of equalization circuitry that can be included in a receiver circuit, such as, for example, receiver circuit 104 of FIG. 1. Equalization circuitry 1600 includes delay line 1610 and adder 1616, which outputs an equalized signal. Delay line 1610 includes a number of delay units 1612 (the three delay units shown are merely illustrative; delay line 1610 may have other numbers of delay units 1612). Advantageously, both the CML based delay stages and the summing CML and LVDS arrangements previously described may be used to obtain the equalized output signal.

Figure 17:
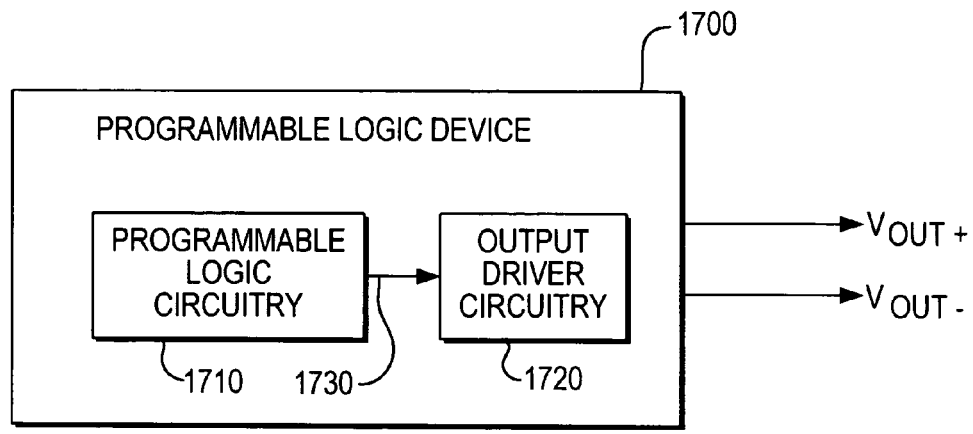
FIG. 17 is a simplified block diagram of illustrative circuitry employing the invention.

Although the circuitry of this invention has many other possible applications, one illustrative use is shown in FIG. 17. In FIG. 17, programmable logic device ("PLD") 1700 is an integrated circuit, preferably an integrated circuit chip, that includes programmable logic circuitry 1710 and output driver circuitry 1720. Output driver circuitry 1720 includes pre-emphasis circuitry in accordance with the invention. PLD 1700 may be field programmable, mask programmable, or programmable in any other way. It may be one-time-only programmable, or it may be reprogrammable. Programmable logic circuitry 1710 produces a data output signal on conductor 1730 that is applied to output driver circuitry 1720. Circuitry 1720 converts this signal to differential output signals VOUT+ and VOUT−, with pre-emphasis, as described earlier in this specification. If only single-ended signaling is desired, only one or the other of VOUT+ or VOUT− is used as mentioned above. PLD 1700 is thus one illustrative embodiment of transmitter circuitry incorporating pre-emphasis circuitry in accordance with the invention.

Figure 18:
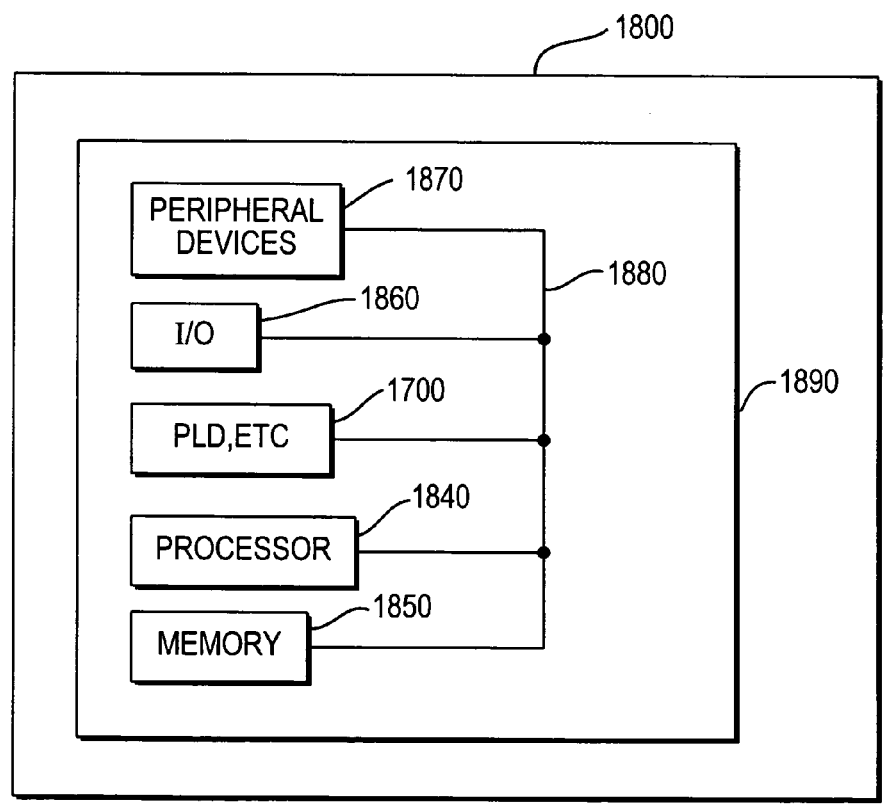
FIG. 18 is a simplified block diagram of an illustrative system employing the invention.

FIG. 18 shows an illustrative larger context in which the invention may be employed. The invention can be used for driving one or more output signals from any one or more of elements 1700, 1840, 1850, 1860, and 1870 out onto system bus or other interconnections 1880. Although the invention is equally applicable in many other types of systems, illustrative system 1800 shown in FIG. 18 may be generally described as a data processing system.

Data processing system 1800 may include one or more of the following components: PLD or other circuitry 1700 like that shown in FIG. 17, a processor 1840, a memory 1850, input/output (I/O) circuitry 1860, and peripheral devices 1870. These components are coupled together by a system bus or other interconnections 1880, and are populated on a circuit board 1890 (e.g., a printed circuit board) that is contained in system 1800. Communication among the various components shown in FIG. 18, and/or with external circuitry, may be of any known type to any desired extent.

System 1800 can be used in a wide variety of applications, such as computer networking, data networking, instrumentation, video processing, digital signal processing, or the like. Circuitry 1700 can be used to perform a variety of different logic functions. For example, circuitry 1700 can be configured as a processor or controller that works in cooperation with processor 1840. Circuitry 1700 may also be used as an arbiter for arbitrating access to a shared resource in system 1800. In yet another example, circuitry 1700 can be configured as an interface between processor 1840 and one of the other components of system 1800. Still further, either processor 1840, memory 1850, or both may include pre-emphasis circuitry in accordance with the invention. Note that system 1800 is only exemplary and in no way should be construed to limit the true scope and spirit of the invention.

Thus it is seen that pre-emphasis circuitries and methods are provided. One skilled in the art will appreciate that the invention can be practiced by other than the described embodiments, which are presented for purposes of illustration and not of limitation, and the invention is limited only by the claims which follow.

We claim:

1. A method of pre-emphasizing an output signal in response to receiving an input signal undergoing a voltage transition, said input signal having a baud period and being at an input voltage level after said transition, said method comprising:
   outputting said output signal at a first voltage level for a first period of time, said first voltage level being greater in magnitude than said input voltage level, said first period of time being less than said baud period; and
   decreasing the magnitude of said output signal to at least one subsequent voltage level, each said at least one subsequent voltage level remaining substantially constant for a subsequent period of time less than said baud period and being smaller in magnitude than the immediately prior voltage level and greater in magnitude than said input voltage level.

2. The method of claim 1 further comprising decreasing the magnitude of said output signal to approximately the magnitude of said input voltage level after said decreasing the magnitude of said output signal to said at least one subsequent voltage level.

3. The method of claim 1 wherein a sum of all said first and subsequent periods of time equals approximately said baud period.

4. The method of claim 1 wherein a sum of all said first and subsequent periods of time is greater than said baud period.

5. The method of claim 1 wherein:
   said input voltage level is a positive voltage representing a logical 1 value; and
   said first voltage level is a more positive voltage than said input voltage level.

6. The method of claim 1 wherein:
   said input voltage level represents a logical 0 value; and
   said first voltage level is a voltage less than or more negative than said input voltage level.

7. A method of pre-emphasizing an output signal in response to receiving an input signal undergoing a voltage transition, said input signal having a baud period and being at an input voltage level after said transition, said method comprising:
   outputting said output signal at a first voltage level for a first period of time, said first voltage level being greater in magnitude than said input voltage level, said first period of time being less than said baud period; and
   sinking a first amount of current after said first period of time to reduce said first voltage level to a second voltage level, said second voltage level being smaller in magnitude than said first voltage level and greater in magnitude than said input voltage level; and
   sinking a second amount of current after a second period of time concurrently with said first sinking to reduce said second voltage level to a third voltage level, said third voltage level being smaller in magnitude than said second voltage level and greater in magnitude than said input voltage level, said second period of time being less than said baud period.

8. The method of claim 7 wherein said sinking a first amount of current comprises activating a first current source after a first delay of said input signal.

9. The method of claim 7 wherein said sinking a second amount of current comprises activating a second current source after a second delay of said input signal, said second delay being greater than said first delay, and said first and second current sources being active concurrently after said second delay.

10. The method of claim 7 further comprising sinking a third amount of current after a third period of time concurrently with said first and second sinking to reduce said third voltage level to about said input voltage level.

11. A method of pre-emphasizing an output signal in response to receiving an input signal undergoing a voltage transition, said input signal having a baud period and being at an input voltage amplitude after said transition, said method comprising:
   generating said output signal at a first voltage amplitude for a first period of time, said first voltage amplitude being greater than said input voltage amplitude, said first period of time being less than said baud period;
   reducing said output signal voltage amplitude to at least one subsequent voltage level between said first voltage amplitude and said input voltage amplitude, each said at least one subsequent voltage level remaining substantially constant for a period of time less than said baud period; and
   reducing said output signal voltage amplitude to approximately said input voltage amplitude after reducing said output signal voltage amplitude to said at least one subsequent voltage level.

12. A circuit operative to pre-emphasize an output signal in response to receiving an input signal having a baud period and undergoing a voltage transition, said circuit comprising:
   an input node operative to receive said input signal;
   an output node;
   a delay line coupled to said input node, said delay line comprising a plurality of output nodes each operative to output a signal having a different delay with respect to said input signal;
   a signal driver coupled to said input node and to said output node, said driver operative to output said output signal at any one of a plurality of degrees of amplification with respect to said input signal;
   a plurality of current sources coupled to said signal driver, each of said current sources operative to draw current from said signal driver and each being individually enabled by a separate enable signal, enablement of each said current source reducing the amplification of said driver output signal; and
   control logic coupled to said delay line output nodes and respectively coupled to each of said current sources, said control logic operative to generate said separate enable signals either individually or concurrently in response to inputs received from said delay line output nodes, said control logic generating no enable signals for at least a portion of said baud period and generating at least one enable signal for least another portion of said baud period.

13. The circuit of claim 12 wherein said delay line comprises a plurality of serially-connected latches, each latch output coupled to a respective delay line output node.

14. The circuit of claim 12 wherein said delay line and control logic comprise:
   a plurality of serially-connected latches, each latch output coupled to a respective delay line output node, each latch operative to receive a control signal;
   a ring oscillator operative to generate an output signal, said oscillator having the same number of delay stages as the number of said serially-connected latches;
   a phase detector operative to receive a clock signal and said ring oscillator output signal and operative to output a signal indicating a phase difference; and
   a charge pump/loop filter operative to receive said phase detector output signal and to output said control signal.

15. The circuit of claim 12 wherein said signal driver comprises current mode logic (CML) circuitry.

16. The circuit of claim 12 wherein said signal driver comprises low voltage differential signaling (LVDS) circuitry.

17. A transmitter circuit comprising said circuit of claim 12.

18. A transceiver circuit comprising said circuit of claim 12.

19. An integrated circuit chip comprising said circuit of claim 12.

20. A programmable logic device comprising said circuit of claim 12.

21. A printed circuit board comprising said circuit of claim 12 mounted on said printed circuit board.

22. The printed circuit board of claim 21 further comprising a memory mounted on said printed circuit board.

23. The printed circuit board of claim 21 further comprising processing circuitry mounted on said printed circuit board.

24. A digital processing system comprising:
a processor;
a memory coupled to said processor; and
said circuit of claim 12 coupled to at least one of said processor and said memory.

25. A digital processing system comprising:
a processor; and
a memory coupled to said processor, wherein at least one of said processor and said memory comprises said circuit of claim 12.

26. A circuit operative to pre-emphasize an output signal in response to receiving an input signal having a baud period and undergoing a voltage transition, said circuit comprising:
an input node operative to receive said input signal;
an output node;
a delay line coupled to said input node, said delay line comprising a plurality of output nodes each operative to output a signal having a different delay with respect to said input signal;
a signal driver coupled to said input node and to said output node, said driver operative to output said output signal at any one of a plurality of degrees of amplification with respect to said input signal;
a plurality of current sources coupled to said signal driver, each of said current sources operative to draw current from said signal driver and each being individually enabled by a separate enable signal, enablement of each said current source reducing the amplification of said driver output signal; and
control logic coupled to said delay line output nodes and respectively coupled to each of said current sources, said control logic operative to generate said separate enable signals either individually or concurrently in response to inputs received from said delay line output nodes.

27. Apparatus for pre-emphasizing an output signal in response to receiving an input signal undergoing a voltage transition, said input signal having a baud period and being at an input voltage level after said transition, said apparatus comprising:
means for outputting said output signal at a first voltage level for a first period of time, said first voltage level being greater in magnitude than said input voltage level, said first period of time being less than said baud period; and
means for decreasing the magnitude of said output signal to at least one subsequent voltage level, each said at least one subsequent voltage level remaining substantially constant for a subsequent period of time less than said baud period and being smaller in magnitude than the immediately prior voltage level and greater in magnitude than said input voltage level.

28. Apparatus for pre-emphasizing an output signal in response to receiving an input signal undergoing a voltage transition, said input signal having a baud period and being at an input voltage amplitude after said transition, said apparatus comprising:
means for generating said output signal at a first voltage amplitude for a first period of time, said first voltage amplitude being greater than said input voltage amplitude, said first period of time being less than said baud period;
means for reducing said output signal voltage amplitude to at least one subsequent voltage level between said first voltage amplitude and said input voltage amplitude, each said at least one subsequent voltage level remaining substantially constant for a period of time less than said baud period; and
means for reducing said output signal voltage amplitude to about said input voltage amplitude after reducing said output voltage level to said at least one subsequent voltage level.

* * * * *